United States Patent
Murakawa et al.

(10) Patent No.: US 7,081,908 B2
(45) Date of Patent: Jul. 25, 2006

(54) APPARATUS AND METHOD FOR TESTING ELECTRODE STRUCTURE FOR THIN DISPLAY DEVICE USING FET FUNCTION

(75) Inventors: Shinichi Murakawa, Hyogo-ken (JP); Takashi Doi, Hyogo-ken (JP); Yoshio Egashira, Hyogo-ken (JP); Shigeo Ueda, Shiga-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 327 days.

(21) Appl. No.: 10/717,540

(22) Filed: Nov. 21, 2003

(65) Prior Publication Data

US 2004/0100299 A1 May 27, 2004

Related U.S. Application Data

(63) Continuation of application No. 09/789,543, filed on Feb. 22, 2001, now abandoned.

(51) Int. Cl.
*G09G 3/36* (2006.01)

(52) U.S. Cl. .......................... 345/904; 345/87; 345/98; 345/100; 324/530

(58) Field of Classification Search .......... 345/87–100, 345/204, 211, 904; 324/527–530, 750
See application file for complete search history.

(56) References Cited

U.S. PATENT DOCUMENTS 5,073,754 A 12/1991 Henley

| | | | |
|---|---|---|---|
| 5,321,354 A | 6/1994 | Ooshima et al. | |
| 5,493,238 A | 2/1996 | Takeuchi | |
| 6,323,653 B1 | 11/2001 | Field et al. | |
| 6,459,284 B1 | 10/2002 | Kumashiro | |

FOREIGN PATENT DOCUMENTS

| | | | |
|---|---|---|---|
| JP | 64-35597 | | 2/1989 |
| JP | 5-11000 | | 1/1993 |
| JP | 10-62474 | | 3/1998 |
| JP | 10-104563 | | 4/1998 |
| JP | 11-153637 | | 6/1999 |
| JP | 2000-055964 | * | 2/2000 |

OTHER PUBLICATIONS

Nobuo Fujii, vol. 13, pp. 41-42, "Analog Electronic Circuit INI Integrated Circuit ERA", May 10, 1990.

* cited by examiner

*Primary Examiner*—Bipin Shalwala
*Assistant Examiner*—David L. Lewis
(74) *Attorney, Agent, or Firm*—Oblon, Spivak, McClelland, Maier & Neustadt (57) ABSTRACT

In a method of testing an electrode structure in which a plurality of electrodes are arranged in a matrix, a test unit is positioned at a position of a target one of the plurality of electrodes apart from the target electrode by a preset distance. The test unit has a MISFET having a source, a gate and a drain. Then, a first voltage is applied to the target electrode such that a gate voltage is induced at the gate by electrostatic induction. Also, a second voltage is applied to at least one of the source and the drain such that current flows between the source and the drain based on the gate voltage. Then, a value of the current is examined to determine an electrical connection state of the target electrode.

5 Claims, 7 Drawing Sheets

APPARATUS AND METHOD FOR TESTING ELECTRODE STRUCTURE FOR THIN DISPLAY DEVICE USING FET FUNCTION

This Application is a Continuation of Ser. No. 09/789,543 filed on Feb. 22, 2001 now abandoned.

BACKGROUND OF THE INVENTION

1. Field of the Invention

The present invention relates to an apparatus and method for testing an electrode structure for a thin display device using a MISFET function.

2. Description of the Related Art

A thin display has been manufactured as a display for a television and a personal computer. As a method of evaluating the electrode structure for such a thin display device, there are known an operational test, a reliability test, and an appearance test. In particular, a conventional test for checking a lighting operation is carried out after a completion of a product.

Figure 1:
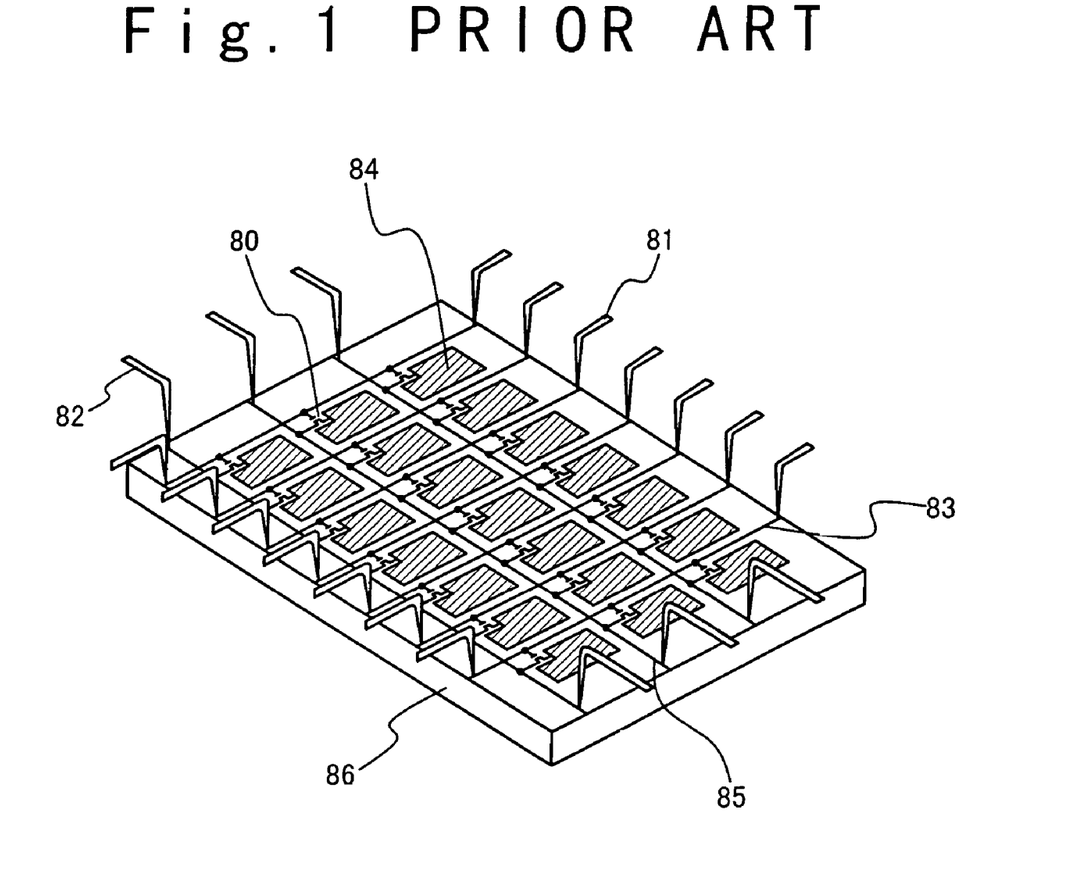
FIG. 1 shows a conventional method of testing an electrode structure for a thin display device.

FIG. 1 shows a conventional method of testing an electrode structure for a thin display device. In the conventional example, the electrode structure for the thin display device such as a liquid crystal display panel is described as an example. The testing method shown in FIG. 1 is referred to as a probing method. In the probing method, the electrode, structure for the thin display device has pixel electrodes arranged in a matrix of n rows and m columns (n and m are integers). Gate electrode wiring lines 83 and source electrode wiring lines 85 are arranged on a substrate 86 to extend longitudinally and laterally between TFT transistors 80.

In this testing method, probes 81 and 82 are set to contact the gate and source voltage wiring lines 83 and 85, to detect output voltages, respectively. Thus, disconnection of the wiring line to the pixel electrode 84, and short-circuit between pixel electrodes are tested. In short, in this method, a defect of the pixel electrode 84 is detected by applying a test signal to the source voltage wiring line 85 and the gate voltage wiring line 83 formed on the electrode structure for the thin display device.

However, the probing method faces the increase of contact errors of the probes and high exchange frequency of the probes, as the electrode structure for the thin display device is made larger. This results in the increase in its maintenance cost.

SUMMARY OF THE INVENTION

Therefore, an object of the present invention is to provide an apparatus and method for testing an electrode structure for a thin display device, in which the electrode structure can be tested in high precision at a high speed.

Another object of the present invention is to provide an apparatus and method for testing an electrode structure for a thin display device, in which the electrode structure can be tested using an FET function of a testing unit without contact of the testing unit with the electrode structure.

Still another object of the present invention is to provide an apparatus and method for testing an electrode structure for a thin display device, in which an electrical disconnection state and a short-circuit state of an electrode can be tested.

In an aspect of the present invention, a method of testing an electrode structure in which a plurality of electrodes are arranged in a matrix, is attained by (a) positioning a test unit at a position of a target one of the plurality of electrodes apart from the target electrode by a preset distance, wherein the test unit has a MISFET having a source, a gate and a drain; by (b) applying a first voltage to the target electrode such that a gate voltage is induced at the gate by electrostatic induction; by (c) applying a second voltage to at least one of the source and the drain such that current flows between the source and the drain based on the gate voltage; and by (d) examining a value of the current to determine an electrical connection state of the target electrode.

It is desirable that the preset distance is equal to or less than 20 µm.

Also, the (d) examining may be attained by determining that the target electrode is electrically disconnected when the current value is lower than a predetermined threshold value.

In this case, the method may further include the steps of (e) applying the first voltage to a next electrode adjacent to the target electrode; and (f) repeating the (d) examining. In this case, the (f) repeating step may be attained by determining that a short circuit is formed between the target electrode and the next electrode when the current value is equal to or larger than a predetermined threshold value.

In another aspect of the present invention, an apparatus for testing an electrode structure in which a plurality of electrodes are arranged in a matrix, includes a testing unit, a driving unit and a control unit. The testing unit includes an array of field effect transistors, each of which has a source, a gate and a drain. The testing unit responds a test instruction to carry out a testing operation for sequentially determining whether each of ones of the plurality of electrodes corresponding to the transistors is in an electrical disconnection state or in a short-circuit state, based on a value of current flowing between the source and the drains in each of the transistors by use of electrostatic induction while a first voltage is selectively applied to the electrodes. The driving unit relatively moves the testing unit with respect to the electrode structure in response to a move instruction while keeping a predetermined distance between the electrode structure and the testing unit. The control unit outputs the test instruction to the testing unit, and outputs a move instruction to the driving unit when the testing operation by the testing unit in response to the test instruction is ended.

The testing unit may carry out a disconnection testing operation of the testing operation in which a second voltage is applied to at least one of the source and the drain in each of the transistors when the first voltage is applied to the corresponding electrodes such that a gate voltage is induced at the gate of the transistor by the electrostatic induction. Then, the testing unit may compare the current value and a threshold value to determine that the corresponding electrode is in the electrical disconnect state when the current value is lower than the threshold value, and repeat the disconnection testing operation to the corresponding electrodes.

Also, the testing unit may carry out a short-circuit testing operation of the testing operation in which the second voltage is applied to at least one of the source and the drain in each of the transistors when the first voltage is applied to an adjacent electrode to the electrode corresponding to the transistor. Then, the testing unit may compare the current value and the threshold value to determine that the corresponding electrode is in a short-circuit state when the current value is equal to or larger than the threshold value, and repeat the short-circuit testing operation to the corresponding electrodes while the first voltage, is applied to the adjacent, electrodes.

Also, the testing unit may be composed of the array of transistors, a group of amplifiers and a comparing unit. The drain of each of the transistors is applied with the second voltage. The group of amplifiers is provided for the array of transistors. Each of the amplifiers amplifies the current value from a corresponding one of the transistors to produce an amplified current value. The comparing unit compares the threshold value and each of the amplified current values while scanning the amplified current values, and outputs to the control unit a comparing result indicating whether each of the amplified current values is equal to or larger than the, threshold value. In this case, the testing unit has a higher stage portion in which the array of the transistors is provided, and a lower stage portion in which the group of amplifiers and the include unit are provided. The higher stage portion opposes to the corresponding electrodes to have the predetermined distance. It is desirable that the predetermined distance is not larger than 20 μm.

In still another aspect of the present invention, a method of testing an electrode structure in which a plurality of electrodes are arranged in a matrix, is attained by (a) carrying out in response to a test instruction, a testing operation for sequentially determining whether each of ones of the plurality of electrodes corresponding to field effect transistors of a testing unit is in an electrical disconnection state or in a short-circuit state, based on a value of current flowing between a source and a drain in each of the transistors by use of electrostatic induction while a first voltage is selectively applied to the electrodes; and by (b) relatively moves the testing unit with respect to the electrode structure in response to a move instruction while keeping a predetermined distance between the electrode structure and the testing unit, the move instruction is issued when the testing operation by the testing unit in response to the test instruction is ended.

The (a) carrying out step may be attained by (c) carries out a disconnection testing operation of the testing operation in which a second voltage is applied to at least one of the source and the drain in each of the transistors when the first voltage is applied to the corresponding electrodes such that a gate voltage is induced at the gate of the transistor by the electrostatic induction; by (d) comparing the current value and a threshold value to determine that the corresponding electrode is in the electrical disconnect state when the current value is lower than the threshold value; and by (e) repeating the disconnection testing operation to the corresponding electrodes.

Also, the (a) carrying out step may be attained by (f) carrying out a short-circuit testing operation of the testing operation in which the second voltage is applied to at least one of the source and the drain in each of the transistors when the first voltage is applied to an adjacent electrode to the electrode corresponding to the transistor; by (g) comparing the current value and the threshold value to determine that,the corresponding electrode is inn a short-circuit state when the current value is equal to or larger than the threshold value; by (h) repeating the short-circuit testing operation to the corresponding electrodes while the first voltage is applied to the adjacent electrodes.

Also, it is desirable that the predetermined distance is not larger than 20 μm.

In yet still another aspect of the present invention, an apparatus for testing an electrode structure in which a plurality of electrodes are arranged in a matrix, includes a testing unit, a driving unit and a control unit. The testing unit includes an array of field effect transistors, each of which has a source, a gate and a drain. The testing unit responds a test instruction to carry out a testing operation for sequentially determining a value of current flowing between, the source and the drain in each of the transistors by use of electrostatic induction from each of ones of the plurality of electrodes corresponding to the transistors while a first voltage is applied to the electrodes. The driving unit relatively moves the testing unit with respect to the electrode structure in response to a move instruction while keeping a predetermined distance between the electrode structure and the testing unit. The control unit outputs the test instruction to the testing unit, and outputs a move instruction to the driving unit when the testing operation by the testing unit in response to the test instruction is ended. Also, the control unit determines each of ones of the plurality of electrodes corresponding to the transistors is in an electrical disconnection state or in a short-circuit state, based on the current value.

The testing unit may carry out a disconnection testing operation of the testing operation in which a second voltage is applied to at least one of the source and the drain in each of the transistors when the first voltage is applied to the corresponding electrodes such that a gate voltage is induced at the gate of the transistor by the electrostatic induction to produce the current value. The control unit may compare the current value and a threshold value to determine that the corresponding electrode is in the electrical disconnect state when the current value is lower than the threshold value.

Also, the testing unit may carry out a short-circuit testing operation of the testing operation in which the second voltage is applied to at least one of the source and the drain in each of the transistors when the first voltage is applied to an adjacent electrode to the electrode corresponding to the transistor, to produce the current value. In this case, the control unit may compare the current value and the threshold value to determine that the corresponding electrode is in a short-circuit state when the current value is equal to or larger than the threshold value.

Also, the testing unit may include the array of transistors, wherein the drain of each of the transistors is applied with the second voltage, a group of amplifiers provided for the array of transistors, wherein each of the amplifiers amplifies the current value from a corresponding one of the transistors to produce an amplified current value, and a switching unit which sequentially outputs the amplified current values to the control units.

Also, the testing unit may have a higher stage portion in which the array of the transistors is provided, and a lower stage portion in which the group of amplifiers and the switching unit are provided. In this case, the higher stage portion opposes to the corresponding electrodes to have the predetermined distance.

BRIEF DESCRIPTION OF THE DRAWINGS

FIG. 7 shows a state in which a potential sensor section is positioned for the test process with regard to a direction of an arrow a.

DESCRIPTION OF THE PREFERRED EMBODIMENT

Hereinafter, an apparatus for testing a an electrode structure for a thin display device according to the present invention will be described below in detail with reference to the attached drawings.

Figure 2:
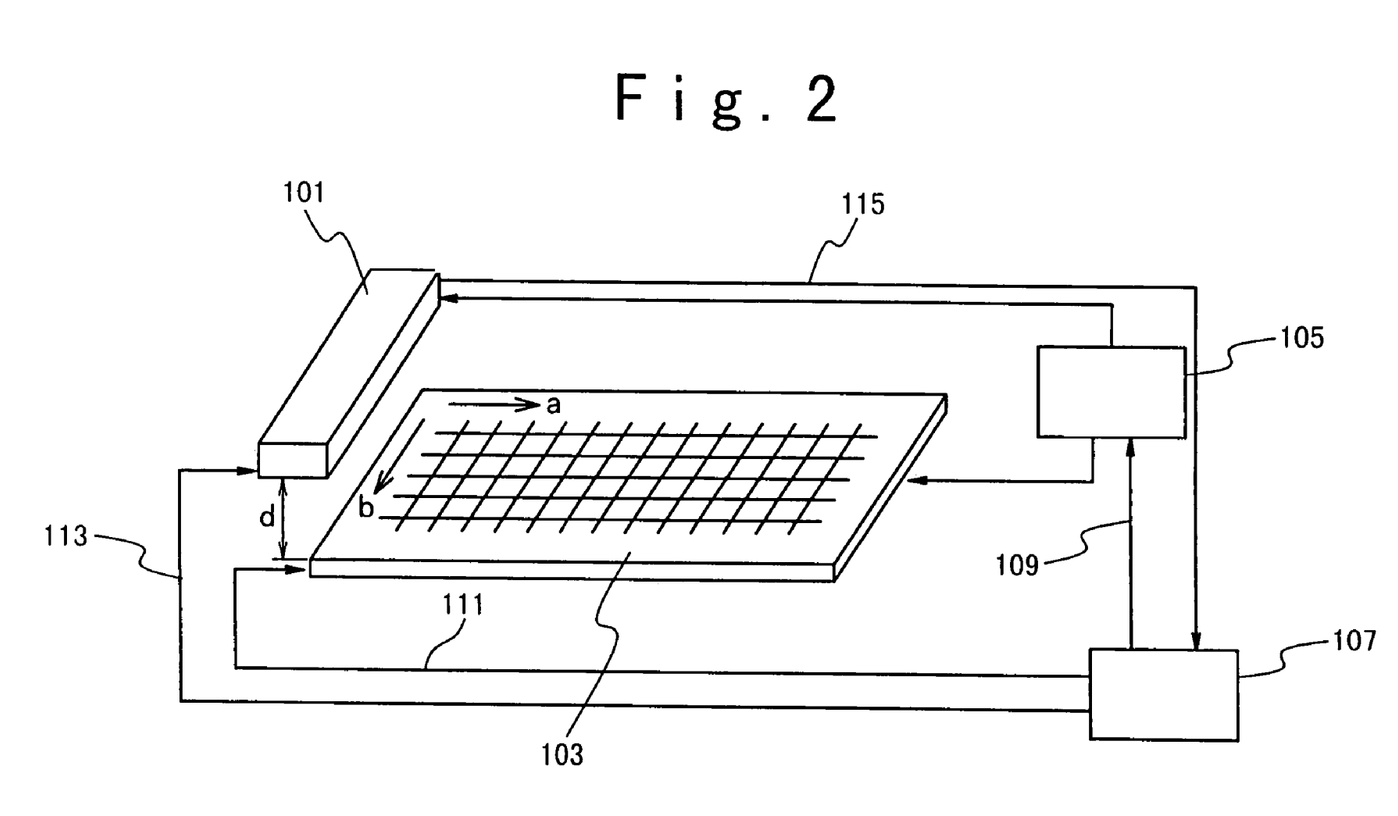
FIG. 2 shows an apparatus for testing an electrode structure for a thin display device according to an embodiment of the present invention.

FIG. 2 shows the testing apparatus according to an embodiment of the present invention. In FIG. 2, the testing apparatus is applied to an electrode structure of a thin display device such as a liquid crystal display panel. Referring to FIG. 2, the testing apparatus is composed of a testing unit 101, a driving unit 105 and a control unit 107. The testing unit 101 is positioned to keep an interval d from the electrode structure for the thin display device 103. The electrode structure 103 has pixel electrodes arranged in a matrix of n rows and m columns (n and m are integers). In FIG. 2, the pixel electrodes are arranged in the direction of an arrow a and the direction of an arrow b.

The control unit 107 receives a test resultant signal 115 from the testing unit 101. When the test resultant signal for all the pixel electrodes for one column or one row is received, the control unit 107 outputs a drive signal 109 to the driving unit 105 such that the testing section 101, is relatively moved with respect to the electrode structure 103 by one row or one column. Also, the control unit 107 applies a pulse voltage signal to test one of the pixel electrodes or a pixel electrode adjacent to the test pixel electrode in the electrode structure 103, after the testing unit 101 and the electrode structure 103 are relatively moved by the one row or the one column. Moreover, the control unit 107 outputs a test start signal 113 to the testing unit 101. The testing unit 101 starts the testing operation in response to the test start signal 113. However, a bias voltage signal as the test start signal 113 may be directly applied to the testing unit 101, in order to operate a plurality of potential sensors of the testing unit 101.

The driving unit 105 moves the testing unit 101 with respect to the electrode structure 103 by one row or one column, in response to the drive signal 109, from the control unit 107.

The testing unit 101 outputs the test resultant signal for each pixel electrode in the electrode structure 103 in response to the test start signal 113 from the control unit 107. The testing unit 101 has a plurality of sensors, each of which has a metal insulator semiconductor field effect transistor (MISFET) function.

Figure 3A:
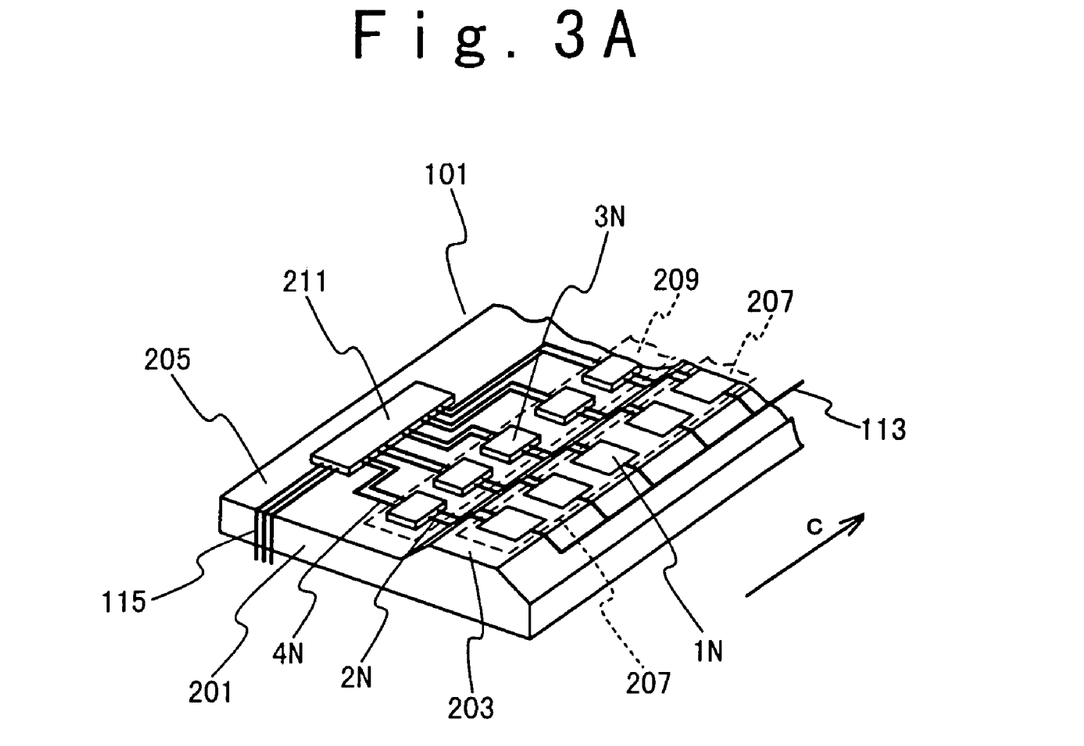
FIG. 3A shows the structure of a testing unit of the testing apparatus according to the embodiment of the present invention.

FIG. 3A shows the structure of the testing unit 101 used in the testing apparatus according to the embodiment of the present invention. Referring to FIG. 3A, the testing unit 101 has a higher stage section 203 and a lower stage section 205 on a substrate 201. The testing unit 101 is composed of a sensor section 207, an amplifier section 209 and a switching section 211.

The sensor section 207 is formed on the higher section 203. The sensor section 207 is composed of a plurality of potential sensors 1N (N is an integer between 1 to n), which are arranged in a line in a direction of an arrow c. It is desirable that the number of sensors 1N is equal to the number of pixel electrodes for one column or one row in the electrode structure 103. Each of the sensors 1N is positioned to oppose to a corresponding one of the pixel electrodes for one row or one column in the electrode structure 103 as shown in FIG. 2. The sensors 1N detects current values corresponding to pixel voltages generated at the opposing pixel electrodes in response to the test start signal 113 from the control unit 107, and then outputs sensor signals 2N (N is an integer between 1 to n) to an amplifier section 209, respectively.

The amplifier section 209 is formed on the lower stage section 205. The amplifier section 209 is composed of a plurality of amplifiers 3N (N is an integer between 1 to n). Each of the amplifiers 3N is connected to a corresponding one of the sensors 1N, and amplifies the sensor signal 2N from the corresponding sensor 1N, and then outputs an amplification signal 4N.

The switching section 211 is formed on the lower stage section 205. Output terminals of the respective amplifiers 3N are connected to the switching section 211. The switching section 211 receives the amplification signals 4N, and sequentially outputs the test resultant signal 115 for the target pixel electrode.

The sensors 1N and the amplifiers 3N are electrically connected through wiring lines to each other, and the amplifiers 3N and the switching section 211 are electrically connected through wiring lines to each other. The wiring line is formed of a metal film on the surface of the substrate 201.

The testing unit 101 shown in FIG. 3A is moved with respect to the electrode structure 103, while keeping a constant interval d from the electrode structure 103. Then, the testing unit 101 outputs the test resultant signal. At this time, the direction of the arrow a or b shown in FIG. 2 is coincident with the direction of the arrow c shown in FIG. 3A.

Figure 4:
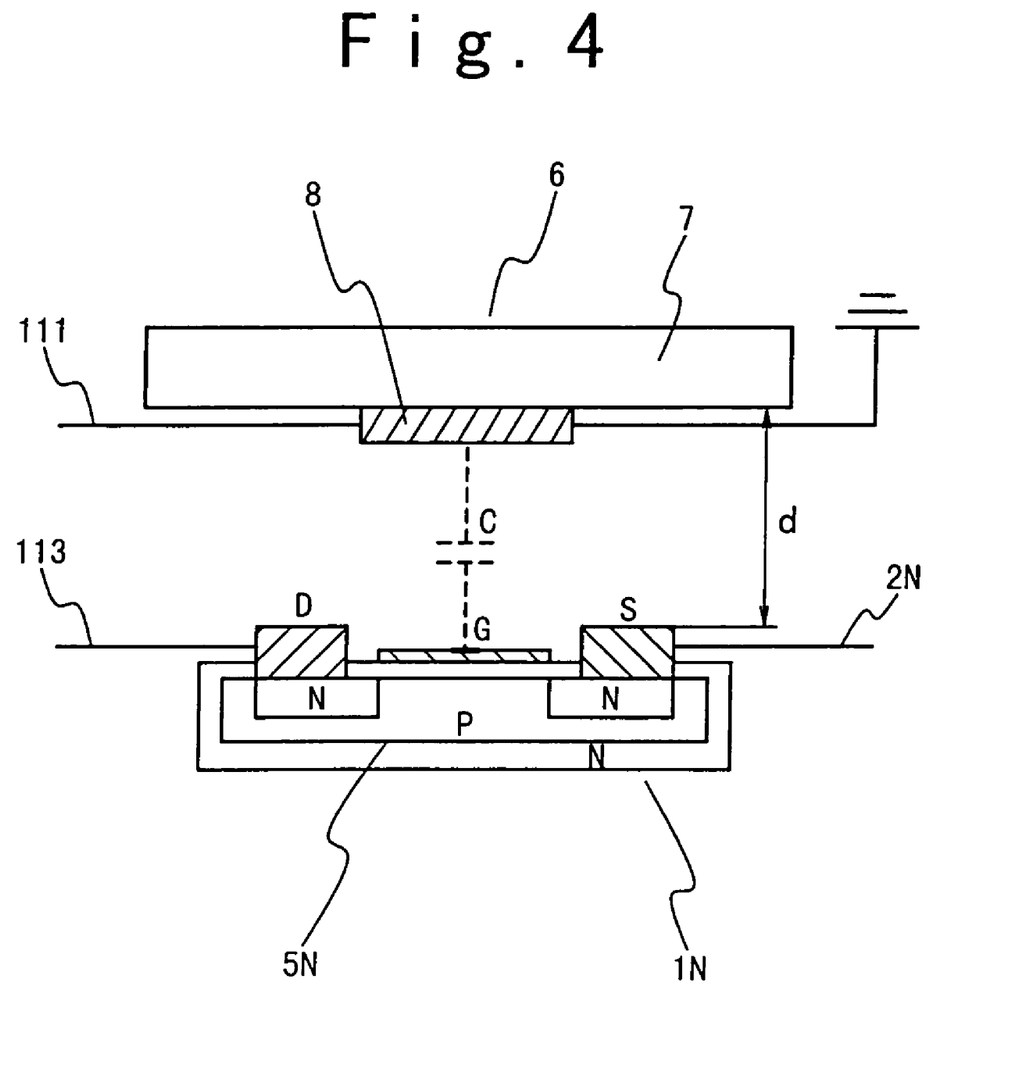
FIG. 4 shows a test principle for each pixel of the electrode structure for the thin display device using the testing unit.

FIG. 4 shows a test process for each pixel electrode of the electrode structure 103 by use of the testing unit 101 shown in FIG. 3A. Referring to FIG. 4, a sensor 1N in the sensor section 207 is arranged to oppose to one pixel electrode 8 of the electrode structure for the thin display device such as a liquid crystal panel 6. The electrode structure of the liquid crystal panel 6 is composed of a glass, substrate 7 and pixel electrodes 8. The pixel electrodes 8 are formed on the surface of the glass substrate 7. The interval d between the glass substrate 7 and a transistor layer 5N (N is an integer between 1 to n) is 20 µm or less.

The sensor 1N utilizes a MISFET (metal-insulator-semiconductor field effect transistor) function. That is, the transistor layer 5N is formed as the sensor on the surface of the higher stage section 203 of the substrate 201 in FIG. 3A. A drain electrode D, a source electrode S and a gate electrode G are formed in the transistor layer 5N.

The control unit 107 applies a direct current bias voltage signal as the test start signal 113 to testing unit 101. Thus, the FET function can be utilized and the bias voltage signal 113 is applied to the drain electrode D. In FIG. 4, a pulse voltage signal as a test signal 111 is applied from the control unit 107 to the pixel electrode 8, so that a pixel voltage is generated at the pixel electrode 8, if the pixel electrode 8 is not electrically disconnected. Also, the gate electrode G is electrostatically connected to the pixel electrode 8 opposite to the sensor 5N through an electrostatic capacitance C corresponding to the interval d. As a result, a gate voltage is induced at the gate electrode G through the electrostatic induction. Since the control unit 107 applies the bias voltage signal 113 to the sensor 1N, a current as the sensor signal 2N flows between the drain electrode D and the source electrode S. Thus, a current value corresponding to the pixel voltage is detected and the sensor signal 2N is outputted to the amplifier 3N. The sensor signal 2N is amplified by the amplifier 3N and outputted to the switching section 211.

Next, a testing method will be described below in case where the plurality of sensors 1N are arranged in the direction of the arrow c, as shown in FIG. 3A. In this case, in order to test the pixel electrodes arranged in a matrix of the n rows and m columns (n and m are the integers), the sensors 1N having the FET function are electrostatically coupled to the plurality of pixel electrodes for one row or one column. At that time, the current value corresponding to the pixel voltage generated at each pixel electrode is detected by the sensor 1N. Then, the detected current value (pixel electrode voltage) is compared with a predetermined threshold value to determine whether the pixel electrode is in an abnormal state or a normal state.

In this test process, the control unit 107 applies the bias voltage 113 as the test start signal to the sensors 1N opposite to the pixel electrodes, while carrying out a sequential switching of the pulse voltage signal as the test signal 111 between the pixel electrodes for one column or row.

Figure 3B:
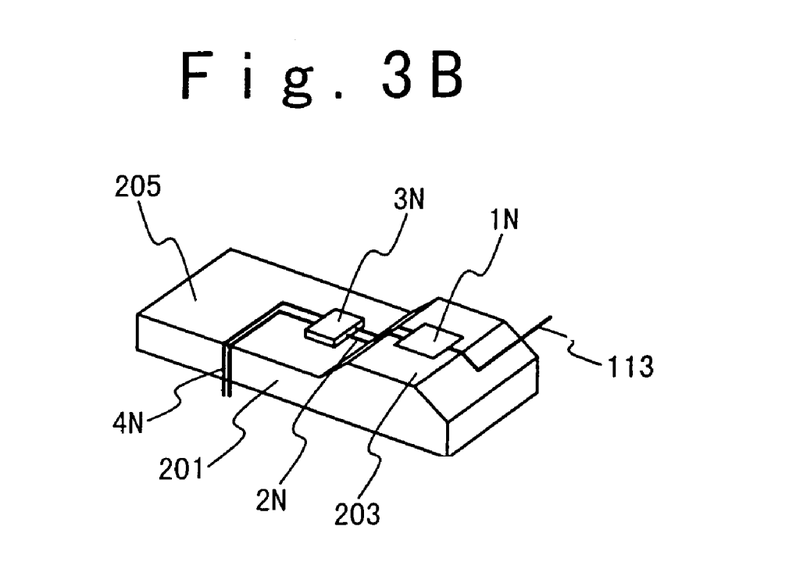
FIG. 3B shows a simple testing unit used in the testing apparatus according to another embodiment of the present invention.

FIG. 3B shows a simple testing unit corresponding to one pixel. This structure is composed of a single sensor 1N having the FET function and a single amplifier 3N. The sensor 1N and the amplifier 3N are identical to those shown in FIG. 3A. The single sensor 1N detects the current value corresponding to the pixel voltage generated at the opposite pixel electrode by use of the electrostatic induction between the opposite pixel electrode and the gate electrode G of the single sensor 1N to output the sensor signal 2N to the amplifier 3N. The amplifier 3N amplifies the sensor signal 2N and outputs the amplification signal 4N to the control unit 107 in this case. The simple testing unit may be applied not only to a partial test. (for example, the test targeting the region of only one row or one column) of the electrode structure shown in FIG. 2, but also to a field in which a non-contact detection of a potential is desirable for a substance (material) at which a voltage is generated.

The method of testing the electrode structure according to the embodiment of the present invention will be described below. At first, the outline of the testing method is described.

The control unit 107 outputs the drive signal 109 to the driving unit 105 when the reception of the test resultant signal 115 is completed. The driving unit 105 drives the testing section 101 or the electrode structure 103 for a thin display device in response to the drive signal 109 such that the testing section 101 is relatively moved with respect to the electrode structure by one row or one column. Then, the control unit 107 may count the number of times of input of the test resultant signal 115 until a predetermined value which is determined based on the number of pixel electrodes for one row or one column or for the region tested by the sensor section 207. Then, the control unit 107 can output the drive signal 109 when the count value reaches the predetermined value.

The driving unit 105 relatively moves the testing unit 101 or the sensor section 207, which is the part of the testing unit 101, or the electrode structure 103 for one row or the one column in response to, the drive signal 109 while keeping the distance between the testing unit 101 and the electrode structure 103. As for this relative movement, the check of the movement can be substantially grasped on the basis of a movement time determined based on a distance between the pixel electrodes and a relatively moving speed.

Then, the control unit 107 outputs the test start signal 113 to the testing unit 101 when the relative movement is completed. As mentioned above, the test start signal 113 is the bias voltage signal to operate the plurality of sensors 1N of the testing unit 101. Also, the control unit.107 outputs the pulse voltage signal 111 to the target pixel electrode of the electrode structure 103.

The operations until the control unit 107 outputs the drive signal 109 in response to the test resultant signal 115 from the testing unit 101 after outputting the signals 111 and 113 will be described below.

Figure 5:
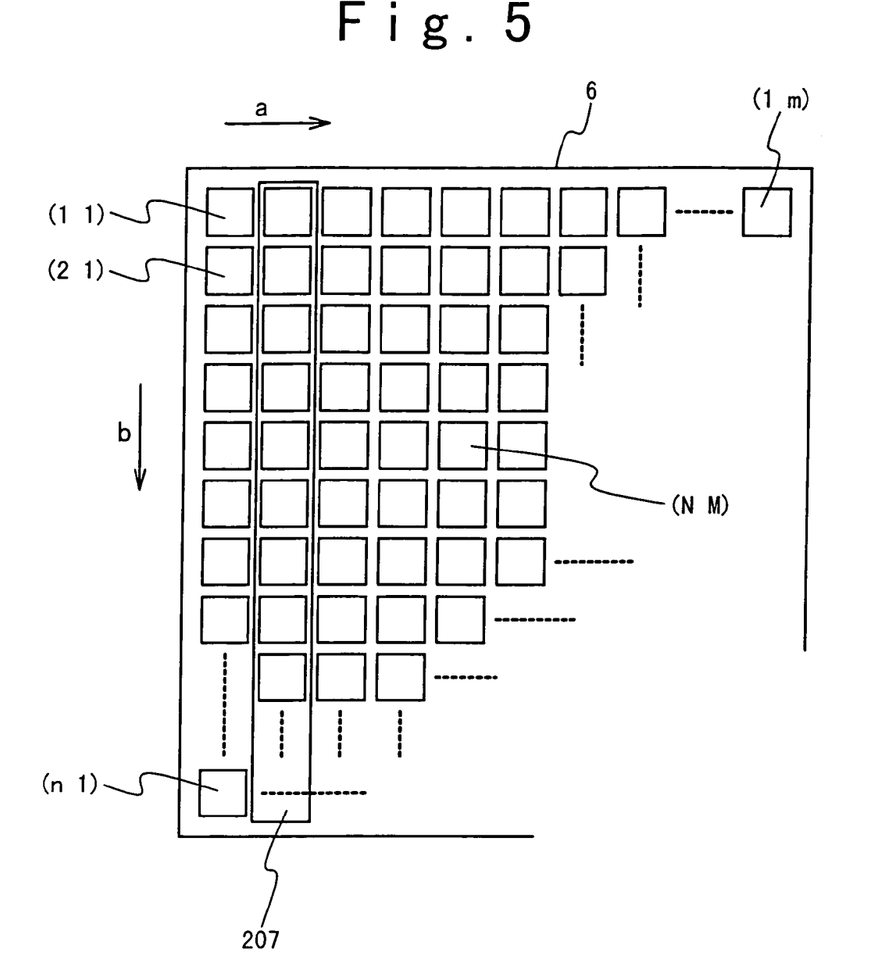
FIG. 5 shows a test process of the electrode structure for the thin display device using the testing unit shown in FIG. 3A.

FIG. 5 shows the positional relation the sensor section 207 and the electrode structure 103, in the test process of the electrode structure 103 for the thin display device 103 such as the liquid crystal panel 6. Referring to FIG. 5, the pixel electrodes in the electrode structure 103 are arranged longitudinally and laterally in a matrix. The total number of pixels is n×m. Each pixel electrode is represented by an address (N,M). Here, N is a natural number from 1 to n, and M is a natural number from 1 to m.

The sensor section 207 is relatively moved while executing the test process in a direction of an arrow a, under the condition that the interval d between the electrode structure 103 for the liquid crystal panel 6 and the testing unit 101 is kept constant (20 µm or less in this example). Sensors (not shown) of the sensor section 207 are assumed to be positioned to oppose to the respective pixel electrodes in a longitudinal column of the liquid crystal panel 6.

Figure 6:
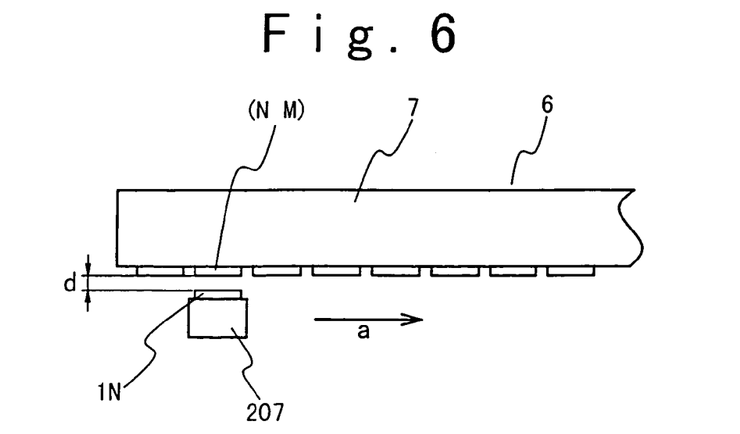
FIG. 6 shows a sectional view of the electrode structure and the testing unit in the test process.

FIG. 6 shows a sectional,view of the electrode structure for the liquid crystal display panel 6 and the testing unit 101 into the direction of the arrow a in FIG. 5. In FIGS. 5 and 6, electrical and mechanical connections between the driving unit 105 and the signals 111 and 113 from the control unit 107 are omitted.

Figure 7:
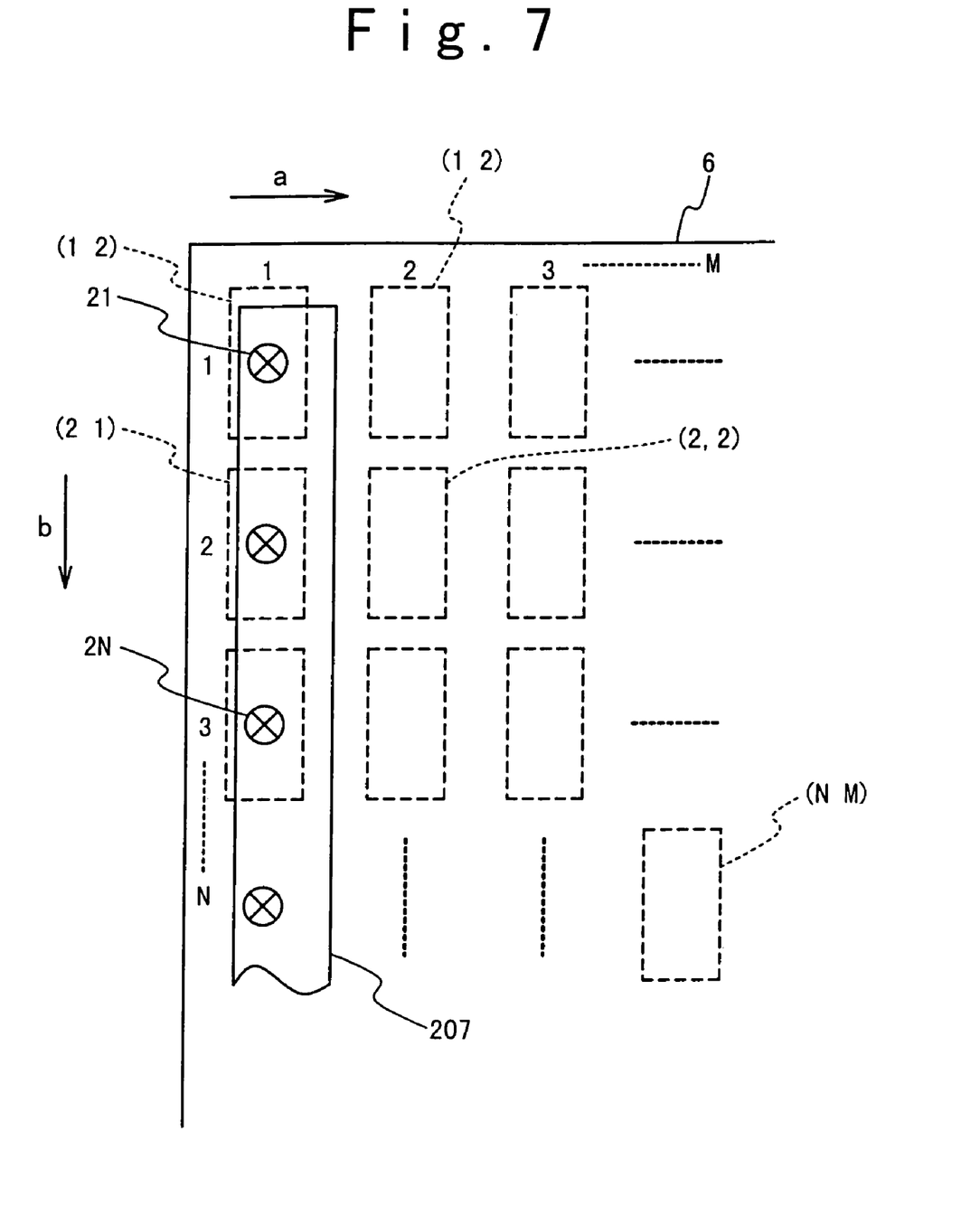

The operations when each pixel electrode responds to the pulse voltage signal 111 from the control unit 107 will be detailed below with reference to FIG. 7. In FIG. 7, electrical and mechanical link between the driving unit 105 and the signals 111 and 113 from the control unit 107 are omitted similarly to FIGS. 5 and 6.

Referring to FIG. 7, the sensor section 207 is stopped at the first column in the direction of an arrow a. The pixel electrodes (11) to (n1) correspond to the respective sensors 11 to 1n of the sensor section 207.

Figure 8A:
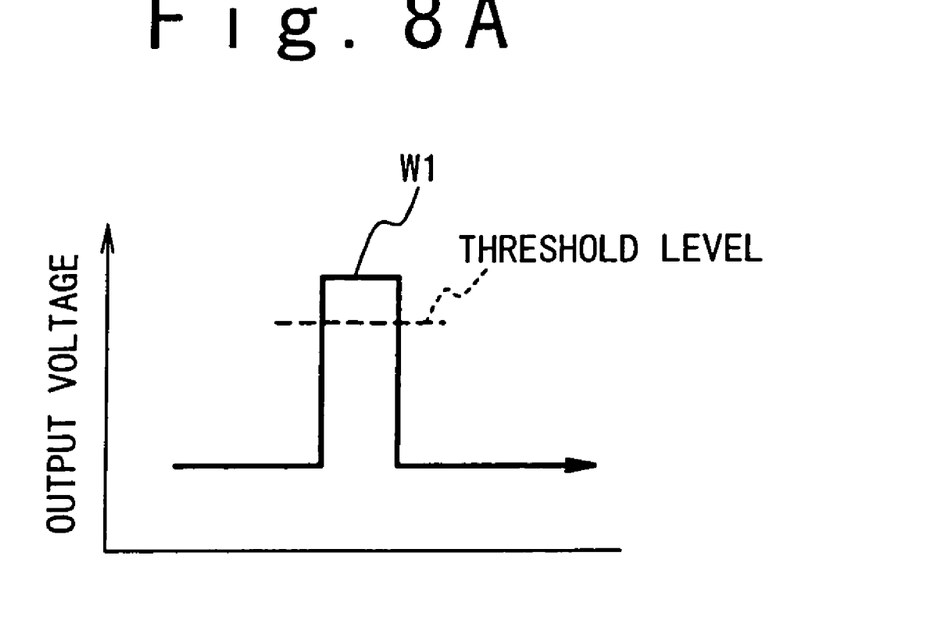
FIGS. 8A and 8B are diagram showing voltage waveforms detected by the potential sensor section.
Figure 8B:
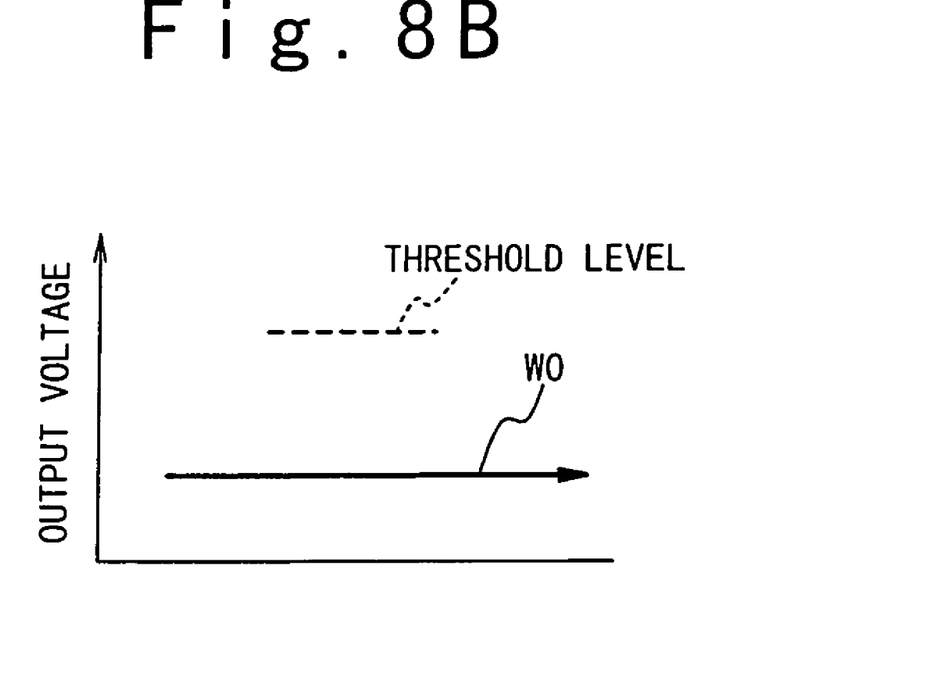

The actual procedure for testing the pixel electrodes will be described below. At first, the test start signal 113 is applied in advance to a sensor section 207. Thus, a sensor function of the sensor section 207 is set to a wait state. Then, the pulse voltage signal 111 is applied to the pixel electrode (11) opposite to the sensor 21. At this time, when the sensor 21 can detect a current value corresponding to a pixel voltage generated at the pixel electrode (11), the testing unit 101 outputs the test resultant signal 115 having an output voltage waveform W1 shown in FIG. 8A. The control unit 107 determines based on a threshold value that the pixel electrode (11) is normal. Oppositely, when the output wave form W1 shown in FIG. 8A cannot be detected, namely, the output wave form W0 shown in FIG. 8B is detected, the testing unit 101 outputs the test resultant signal 115 having the output voltage of zero. In this case, the control unit 107 determines based on the threshold value that the target pixel electrode (11) is in an electrically disconnection state.

Next, the formation of the short-circuit with a pixel electrode adjacent to the target pixel electrode (11) is tested. The pulse voltage signal 111 is applied to a pixel electrode (21) under the condition that the bias voltage signal 113 is applied to the sensor 21. At this time, the sensor 21 detects a current value corresponding to a pixel voltage from the target pixel electrode (11). If the testing unit 101 detects the test resultant signal 115 having the output voltage waveform W1 shown in FIG. 8A, the control unit 107 determines based on the threshold value that the pixel electrode (11) and the pixel electrode (21) are short-circuited. On contrary, as shown in FIG. 8B, if the output wave form W0 is detected by the testing unit 101, the control unit 107 determines that the target pixel electrode (11) and the pixel electrode (22) are not short-circuited to each other.

In the above description, the comparing operation of the output voltage waveform with the threshold value is accomplished by the control unit 107. However, the comparing operation may be accomplished in the testing unit 101. In this case, the switching section 211 carries out the comparing operation as a comparing section 211 and outputs the comparing result to the control unit 107.

Similarly to the above-mentioned test procedure, in FIG. 7, a short-circuit state between the pixel electrode (11) and a pixel electrode (12) and a short-circuit stage between the pixel electrode (11) and a pixel electrode (22) are tested by applying the pulse voltage signal 111 to the pixel electrode (22) and the pixel electrode (12) adjacent to the pixel electrode (11).

The above-mentioned test method can test the presence or absence of the electrical disconnection of the pixel electrode, (11) and the presence or absence of the short-circuit between the pixel electrode (11) and the pixel electrode adjacent to the pixel electrode (11).

Also, in the process for testing the target pixel electrode (11), the sensor 21 outputs the sensor signal 21 (because N is 1 in this case) based on a pixel voltage generated at the pixel electrode (11). Within the testing unit 101, the amplifier 31 (N is 1 in this case) amplifies the sensor signal 21, and outputs the amplification signal 41 (N is 1 in this case). The amplification signals 4N are sequentially outputted,as the test resultant signal 115 to the control unit 107 by the switching section 211. From the above-mentioned description, the control unit 107 counts the test resultant signal 115 four times in the process for testing the target pixel electrode (11).

That is, the control unit 107 sets the number of times of input of the test resultant signal 115 for each pixel electrode in advance by use of a table, and compares the count value with the number of times of input of the test resultant signal for each pixel electrode. Thus, it is possible to proceed to the test of the pixel electrode (21) for a next pixel electrode. The number of times of input depends on the location at which each pixel electrode is arranged.

Next, the pixel electrode (21) is selected as the target pixel electrode. At first, the control unit 107 checks the arrival of the test resultant signal 115 the preset number of times of input (four times in the case of the pixel electrode (11)), and starts the test process of the target pixel electrode (21). This implies that the control unit 107 firstly applies the test start signal 113 to the sensor 22 opposite to the pixel electrode (21), and then applies the pulse voltage signal 111 to the target pixel electrode (21).

Similarly to the test of the pixel electrode (11), the presence or absence of the disconnection of the pixel electrode (21) and the presence or absence of the short-circuit between the pixel electrode (21) and the pixel electrode adjacent to the pixel electrode (21) are tested with respect to the target pixel electrode (21).

The above-mentioned test process is repeated to the n pixel electrodes in the direction of the arrow b shown in FIG. 7. The control unit 107 counts the number of times of input of the test resultant signal 115 corresponding to the number of pixel electrodes (n pixels). When the count value reaches a value set in advance, the control unit 107 outputs the drive signal 109 to the driving unit 105 to relatively move the sensor section 207 and the liquid crystal panel 6 by one column.

The above test procedure is carried out as follows. At first, a target pixel electrode, or a pixel electrode adjacent to the target pixel electrode sequentially responses to the pulse voltage signal 111, and sequentially generates a pixel electrode voltage at the target pixel electrode. In the testing unit 101, the sensor opposite to the target pixel electrode responds the test start signal 113 to use the FET function, and sequentially detects a current value corresponding to the pixel voltage through the electrostatic induction to the gate electrode from the pixel electrode voltage. Then, in the testing unit 101, the test resultant signal 115 for the target pixel electrode is sequentially outputted. As a result, the control unit 107 sequentially outputs the pulse voltage signal 111 to a next target pixel electrode or a pixel electrode adjacent to the next target pixel electrode based on the preset number of times of input the test resultant signal 115 for the next target-pixel electrode. Also, the test start signal 113 is outputted to a sensor opposite to the next target pixel electrode.

The above-mentioned procedure is performed on the pixel electrodes in the column direction. The drive signal 109 is outputted based on the accumulated number of times of input of the test resultant signal 115 in the preset column unit. Accordingly, the driving unit 105 is operated. Thus, the test of a next target column of pixel electrodes can be carried out.

According to this test procedure, the liquid crystal panel 6 with the pixel electrodes in a matrix of n×m can be tested by relatively moving the testing unit 101 or the sensor section 207, which is the part of the testing unit 101, in the direction of the arrow a. In this case, this embodiment includes the duplication in the short-circuit test of the target pixel electrode. However, the test can be carried out so as to avoid the duplication in the short-circuit test. This implies the following control. For example, the pulse voltage signal 111 may be not applied to the pixel electrode (11), when a short-circuit of a next target pixel electrode (21) should be tested after the short-circuit of the target pixel electrode (11) is tested by applying a pulse voltage signal 111 to the pixel electrode (21).

Alternatively, the pulse voltage signal 111 may be applied to the pixel electrodes (12), (22), and (21) at a time for the short-circuit test of the pixel electrode (11) after the disconnection test of the pixel electrode (11). As a result, the testing operation time can be shortened. In this case, the pulse voltage signal 111 is applied to the pixel electrodes (13) and (31) at a time for the short-circuit test of the pixel electrode (21), if the pixel electrode (11) is not short-circuited. Thus, the number of pixel electrodes to which the pulse voltage signal 111 should be applied can be reduced. Also, if the short-circuit is detected, the pulse voltage signal 111 may be individually applied to each of the related pixel electrodes.

Also, this embodiment is designed such that the sensor section 207 is composed of the sensors 1N (N is the integer from 1 to n), in which the number of sensors 1N corresponds to the number (n) of pixel electrodes corresponding to one column in the liquid crystal panel 6, as shown in FIG. 5 or 7. Similarly, the sensor section 207 is composed of m sensors corresponding to the (m) pixel electrodes for one row so that the test can be carried out in the direction of the arrow b shown in FIG. 7.

Depending on the total number (n×m) of pixel electrodes, the region of the pixel electrodes arranged in the matrix in the liquid crystal panel 6 is divided into a plurality of regions, and the sensors of the sensor section 207 corresponding to the region may be mounted. In this case, the control is carried out so as to scan only the target regions.

By using the testing apparatus of the electrode structure for a thin display device according to the present invention, it is possible to carry out the test at the high speed and at the high accuracy.

What is claimed is:

1. An apparatus for testing a pixel electrode structure in which a plurality of pixel electrodes are arranged in a matrix of n rows and m columns, each of n and m being a natural number more than 1, and each of said plurality of pixel electrodes being activated, comprising:

a testing unit which has at least one potential sensor using an FET function in which a specific one of said plurality of pixel electrodes is used as a gate of an FET;

wherein said at least one potential sensor is arranged opposite to said specific pixel electrode while keeping a predetermined distance from said specific pixel electrode, said potential sensor including two semiconductor regions of a first conductive type provided separately in a semiconductor region of a second conductive type, said PET function is realized by said potential sensor and said specific pixel electrode, said potential sensor is activated in response to a sensor activation signal to output a voltage detection result associated with an activated pixel electrode;

a drive section which relatively drives said tasting unit to said specific pixel electrode with respect to said pixel electrode structure while keeping said predetermined distance, in response to a testing unit drive signal; and a control unit which outputs said testing unit drive signal to said drive section, sequentially activates said specific pixel electrode and pixel electrodes adjacent to said specific pixel electrode when said testing unit is driven to said specific pixel electrode, outputs said sensor activation signal to said testing unit, and detects a disconnection of said specific pixel electrode and a short-circuit between said specific pixel electrode and each of said adjacent pixel electrodes based on said voltage detection result.

2. The apparatus according to claim 1, wherein said testing unit comprises:

a plurality of said potential sensors arranged in one line, said control unit outputs said sensor activation signal to said testing unit for each of said plurality of potential sensors, sequentially activates ones of said plurality of pixel electrodes corresponding to said plurality of potential sensors when each of said plurality of potential sensors is activated, and detects the disconnections of said pixel electrodes corresponding to said plurality of potential sensors based on said voltage detection results from said testing unit.

3. The apparatus according to claim 2, wherein when each of said plurality of potential sensors is activated, said control unit sequentially activates each of said adjacent pixel electrodes to said specific pixel electrode corresponding to the activated potential sensor, and detects the short-circuit between said specific pixel electrode and the activated adjacent pixel electrode based on said voltage detection result from said testing unit.

4. The apparatus according to claim 2, wherein said testing unit comprises:

said plurality of potential sensors;

a plurality of amplifiers respectively connected with said plurality of potential sensors; and a scanner which sequentially selects outputs of said plurality of amplifiers for output to said control unit as said voltage detection result.

5. The apparatus according to claim 3, wherein said testing unit comprises:

said plurality of potential sensors;

a plurality of amplifiers respectively connected with said plurality of potential sensors; and a scanner which sequentially selects outputs of said plurality of amplifiers for output to said control unit as said voltage detection result.

* * * * *